US010899558B2

(12) United States Patent
Berceanu et al.

(10) Patent No.: US 10,899,558 B2
(45) Date of Patent: Jan. 26, 2021

(54) BOTTLE NECK GRIPPER

(71) Applicant: FEDERAL MFG. LLC, Waukesha, WI (US)

(72) Inventors: Alexandru Berceanu, Quebec (CA); Cezary Mroz, Elkhorn, WI (US); Michael J. Nieberding, Cincinnati, OH (US)

(73) Assignee: FEDERAL MFG. LLC, Waukesha, WI (US)

( * ) Notice: Subject to any disclaimer, the term of this patent is extended or adjusted under 35 U.S.C. 154(b) by 0 days.

(21) Appl. No.: 16/672,976

(22) Filed: Nov. 4, 2019

(65) Prior Publication Data

US 2020/0148523 A1    May 14, 2020

Related U.S. Application Data

(60) Provisional application No. 62/757,395, filed on Nov. 8, 2018.

(51) Int. Cl.
| | |
|---|---|
| *B65G 47/84* | (2006.01) |
| *B67C 3/24* | (2006.01) |
| *B65G 47/92* | (2006.01) |
| *B65G 47/86* | (2006.01) |

(52) U.S. Cl.
CPC ......... *B65G 47/848* (2013.01); *B65G 47/847* (2013.01); *B65G 47/92* (2013.01); *B67C 3/242* (2013.01); *B65G 2201/0247* (2013.01)

(58) Field of Classification Search
CPC .... B65G 47/847; B65G 47/848; B65G 47/92; B65G 2201/0247; B67C 3/242
See application file for complete search history.

(56) References Cited

U.S. PATENT DOCUMENTS

| | | | |
|---|---|---|---|
| 6,386,609 B1 * | 5/2002 | Govzman | ............ B25J 15/0253 |
| | | | 294/119.1 |
| 7,784,603 B2 * | 8/2010 | Burgmeier | ............. B65G 47/90 |
| | | | 198/468.5 |
| 8,128,142 B2 | 3/2012 | Glotzl | |
| 8,297,671 B2 | 10/2012 | Knieling | |
| 8,342,314 B2 * | 1/2013 | Michel | ................. B65G 47/905 |
| | | | 198/468.5 |
| 8,387,773 B2 | 3/2013 | Fahldieck | |
| 8,424,940 B2 | 4/2013 | Sarda | |

(Continued)

FOREIGN PATENT DOCUMENTS

WO    WO 201003482    5/2009

*Primary Examiner* — Gene O Crawford
*Assistant Examiner* — Keith R Campbell
(74) *Attorney, Agent, or Firm* — Thompson Hine LLP (57) ABSTRACT

A bottle neck gripper includes first and second jaw components, each pivotally mounted for rotation about a respective pivot axis, the first jaw component including a first permanent magnet mounted thereon, the second jaw component including a second permanent magnet mounted thereon. The first permanent magnet and second permanent magnet are positioned to be attracted to each other. An attractive force of the magnets urges grip ends of the first and second jaw components toward each other. The pivot axis of the first jaw component is located between the first permanent magnet and the grip end, and the pivot axis of the second jaw component is located between the second permanent magnet and the grip end.

12 Claims, 12 Drawing Sheets

(56) References Cited

U.S. PATENT DOCUMENTS

| | | |
|---|---|---|
| 8,465,070 B2 | 6/2013 | Knieling |
| 8,556,317 B2 | 10/2013 | Bodtlander |
| 8,672,376 B1 | 3/2014 | Wilson |
| 8,701,872 B2 * | 4/2014 | Fahldieck ............... B67C 3/242 |
| | | 198/803.7 |
| 8,794,425 B2 | 8/2014 | Fahldieck |
| 8,833,824 B2 | 9/2014 | Fahldieck |
| 8,894,114 B2 | 11/2014 | Fahldieck |
| 9,102,479 B2 | 8/2015 | Schulnig |
| 9,463,591 B2 | 10/2016 | Winzinger |
| 9,774,221 B1 | 9/2017 | Holland |
| 9,878,483 B2 | 1/2018 | Leroux |
| 10,315,904 B2 * | 6/2019 | Landler ................ B65G 47/847 |

* cited by examiner

BOTTLE NECK GRIPPER

TECHNICAL FIELD

This application relates generally to a device for gripping and retaining bottles (e.g., in filling systems) for the purpose of transporting the bottles.

BACKGROUND

Bottle neck grippers in which two opposing jaws form a bottle neck receiving mouth, and in which the two jaws are biased toward each other, are known. A variety of configurations for biasing the jaws together have been used, including both mechanical biasing based upon springs and magnetic biasing by using one or more magnets.

For example, U.S. Pat. No. 7,784,603 discloses a gripping device that requires three permanent magnets. U.S. Pat. No. 8,297,671 discloses a gripper which requires a force storing unit in the form of a pair of mutually repelling permanent magnets. U.S. Pat. No. 8,556,317 discloses a gripper in which each gripper arm has a pair of permanent magnets, and a carrier plate has two pairs of permanent magnets. U.S. Pat. No. 8,701,872 discloses a gripper which requires a clip with opposed clip arms, where each clip arm has a permanent magnet between the grip area and the swivel axis. U.S. Pat. No. 9,463,591 discloses a gripper which requires an actuatable electric or magnetic drive to move the gripper claws.

It would be desirable to provide a bottle neck gripper with improved design and strong performance.

SUMMARY

In one aspect, a bottle neck gripper includes first and second jaw components, each pivotally mounted for rotation about a respective pivot axis, the first jaw component including a first permanent magnet mounted thereon, the second jaw component including a second permanent magnet mounted thereon. The first permanent magnet and second permanent magnet are positioned to be attracted to each other. An attractive force of the magnets urges grip ends of the first and second jaw components toward each other. The pivot axis of the first jaw component is located between the first permanent magnet and the grip end, and the pivot axis of the second jaw component is located between the second permanent magnet and the grip end.

In another aspect, a bottle neck gripper includes: a first jaw component mounted for pivot about a first pivot axis, the first jaw component including a first grip part and a first biasing part, wherein the first pivot axis intersects the first jaw component at a first location between the first grip part and the first biasing part, wherein the first jaw component includes a first permanent magnet carried on the first biasing part; a second jaw component mounted for pivot about a second pivot axis, the second jaw component including a second grip part and a second biasing part, wherein the second pivot axis intersects the second jaw component at a second location between the second grip part and the second biasing part, wherein the second jaw component includes a second permanent magnet carried on the second biasing part; and wherein the first permanent magnet and the second permanent magnet are positioned to be attracted to each other and an attractive force between the first permanent magnet and the second permanent magnet urges the first grip part and the second grip part together.

In a further aspect, a bottle neck gripper includes first jaw component mounted for pivot about a first pivot axis, the first jaw component including a first grip part, the first jaw component carrying a first permanent magnet; a second jaw component mounted for pivot about a second pivot axis, the second jaw component including a second grip part, the second jaw component carrying a second permanent magnet; wherein the first grip part includes a first distal end and the second grip part includes a second distal end, wherein the bottle neck gripper includes a resting state in which the first distal end and the second distal end are spaced from each other by a first linear distance to define a passage for entry of a bottle neck; and wherein the first pivot axis is substantially parallel to the second pivot axis, wherein the first pivot axis is separated from the second pivot axis by a second linear distance, wherein a bisecting plane bisects the first linear distance and the second distance and runs substantially parallel to the first pivot axis and the second pivot axis, wherein the first distal end is positioned on a first side of the bisecting plane and the first permanent magnet is positioned on a second side of the bisecting plane, wherein the second distal end is positioned on the second side of the bisecting plane and the second permanent magnet is positioned on the first side of the bisecting plane.

In yet another aspect, a bottle neck gripper includes: a first jaw component mounted for pivot about a first pivot axis, the first jaw component including a first grip part, the first jaw component carrying a first permanent magnet; a second jaw component mounted for pivot about a second pivot axis, the second jaw component including a second grip part, the second jaw component carrying a second permanent magnet; wherein the first jaw component includes a projecting finger on which the first permanent magnet is carried, the second jaw component includes a leg on which the second permanent magnet is carried, the leg including an opening, wherein the finger is positioned in the opening to position the first permanent magnet in magnetic proximity to the second permanent magnet.

The details of one or more embodiments are set forth in the accompanying drawings and the description below. Other features, objects, and advantages will be apparent from the description and drawings, and from the claims.

DETAILED DESCRIPTION

As shown in the attached FIGS. 1-12, a bottle neck gripper 10 includes jaw components 12 and 14, where jaw component 12 is pivotal about an axis 16 and jaw component 14 is pivotal about a separate axis 18. To facilitate such pivotal movement, each component is mounted to a support plate 20 via respective pins 22, 24 that pass through openings 26, 28 in the components 12, 14 and then into respective openings 30, 32 of the support plate 20. The pins include respective external heads 34, 36 that retain the jaw components against the lower surface of the support plate 20. The support plate includes additional openings 38, 40 that can be used to mount the gripper to a machine (e.g., part of a filling machine).

Each jaw component 12, 14 includes a respective grip part 42, 44 located to one side of its axis 16, 18 and a biasing part 46, 48 located to the other side of its axis 16, 18. Each biasing part 46, 48 includes a respective permanent magnet 50, 52 carried thereon. The permanent magnets 50, 52 are positioned to be attracted to each other, and an attractive force between the permanent magnets (F1+F2) urges the grip parts together. In particular, per FIG. 3, force F1 acts to urge pivot of jaw component 12 about the axis 16 so as to urge grip part 42 in direction D1, and force F2 acts to urge pivot of jaw component 14 about the axis 18 to urge grip part 46 in direction D2.

Figure 1:
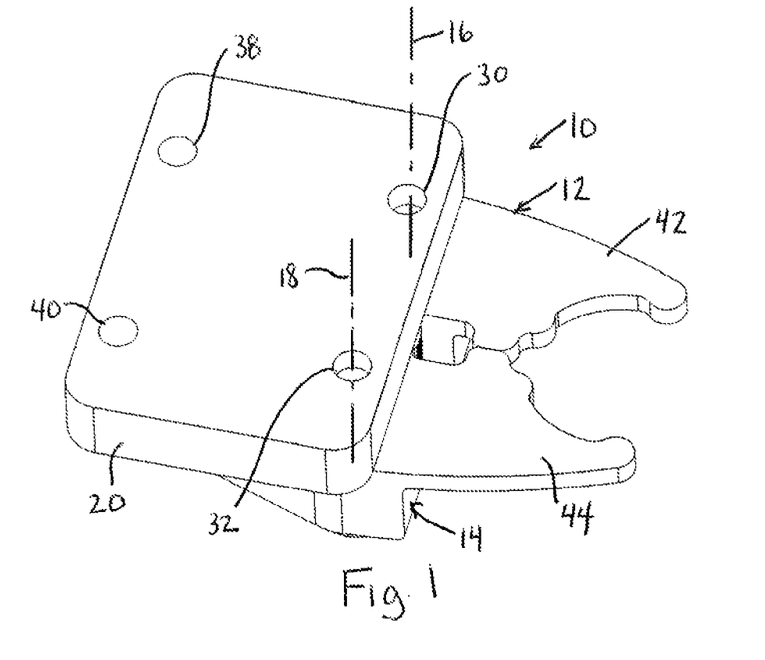
FIG. 1 is a top perspective view of a bottle neck gripper.
Figure 2:
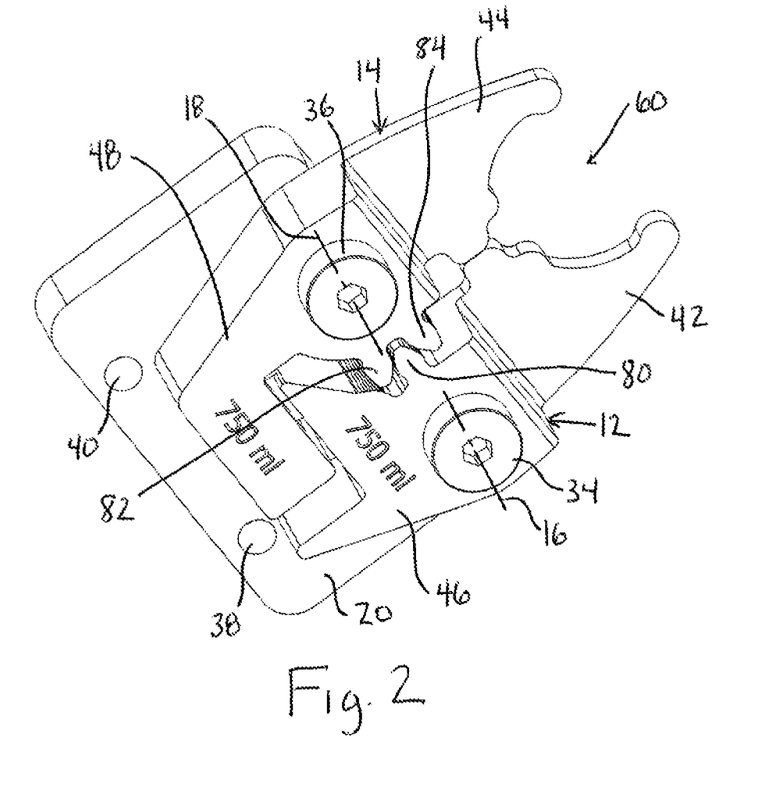
FIG. 2 is a bottom perspective view of the gripper.
Figure 3:
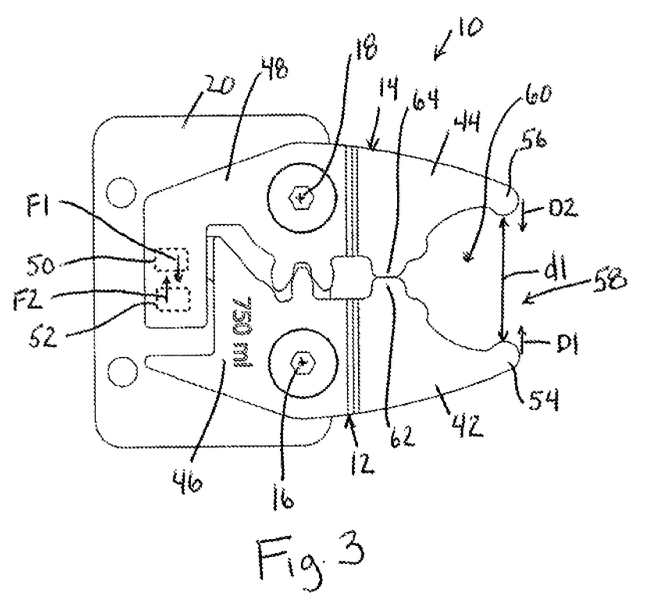
FIG. 3 is a bottom plan view of the gripper in a resting state.
Figure 4:
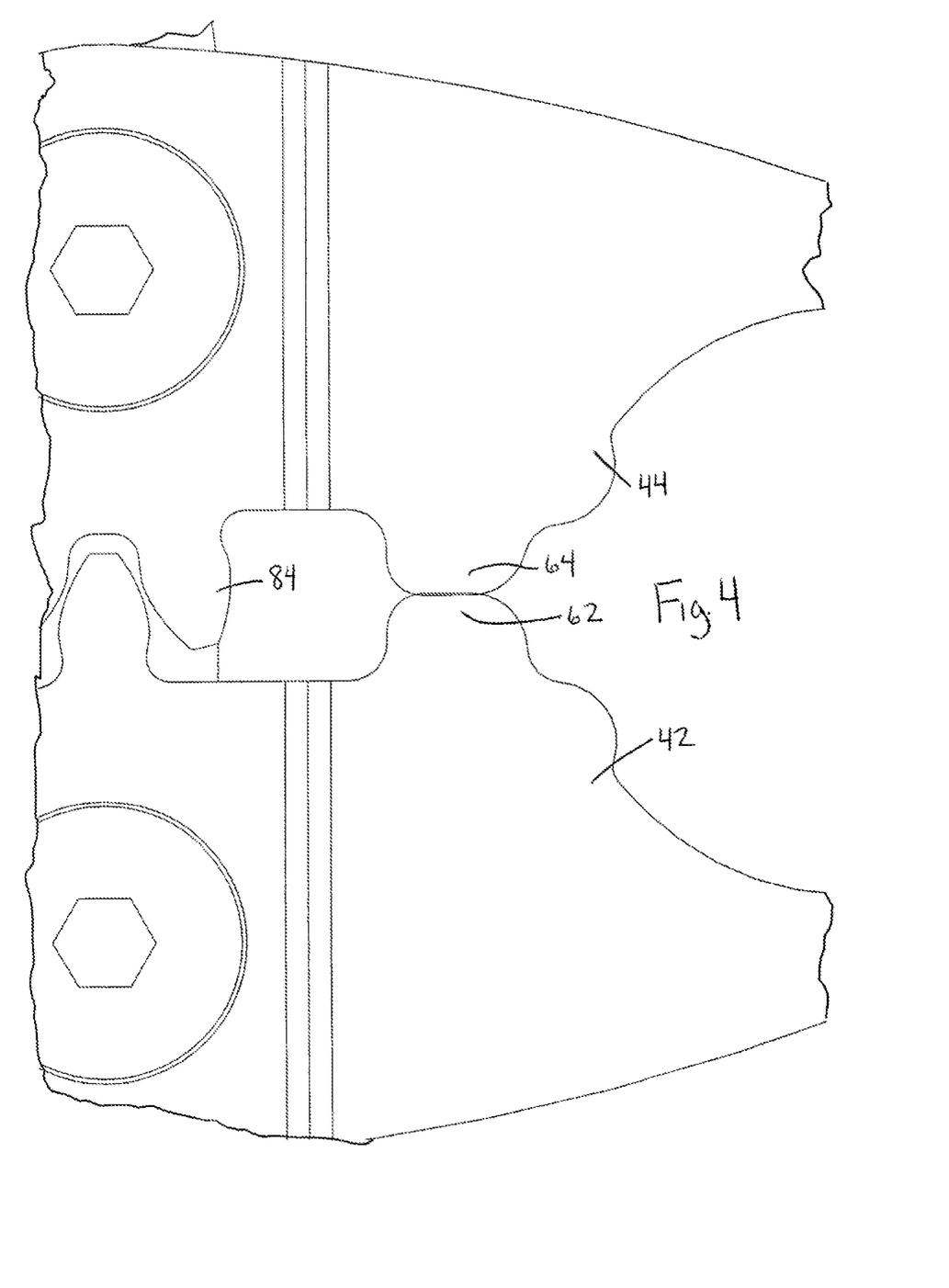
FIG. 4 is an enlarged partial view of FIG. 3.
Figure 5:
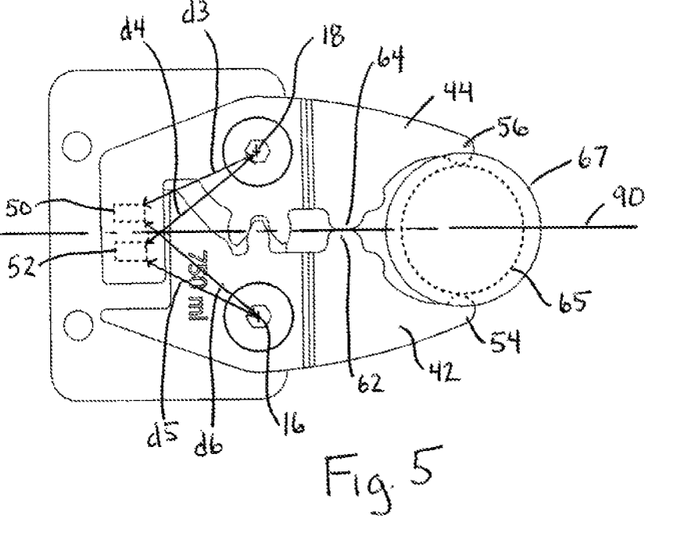
FIG. 5 is a bottom plan view of the gripper during bottle neck entry.
Figure 6:
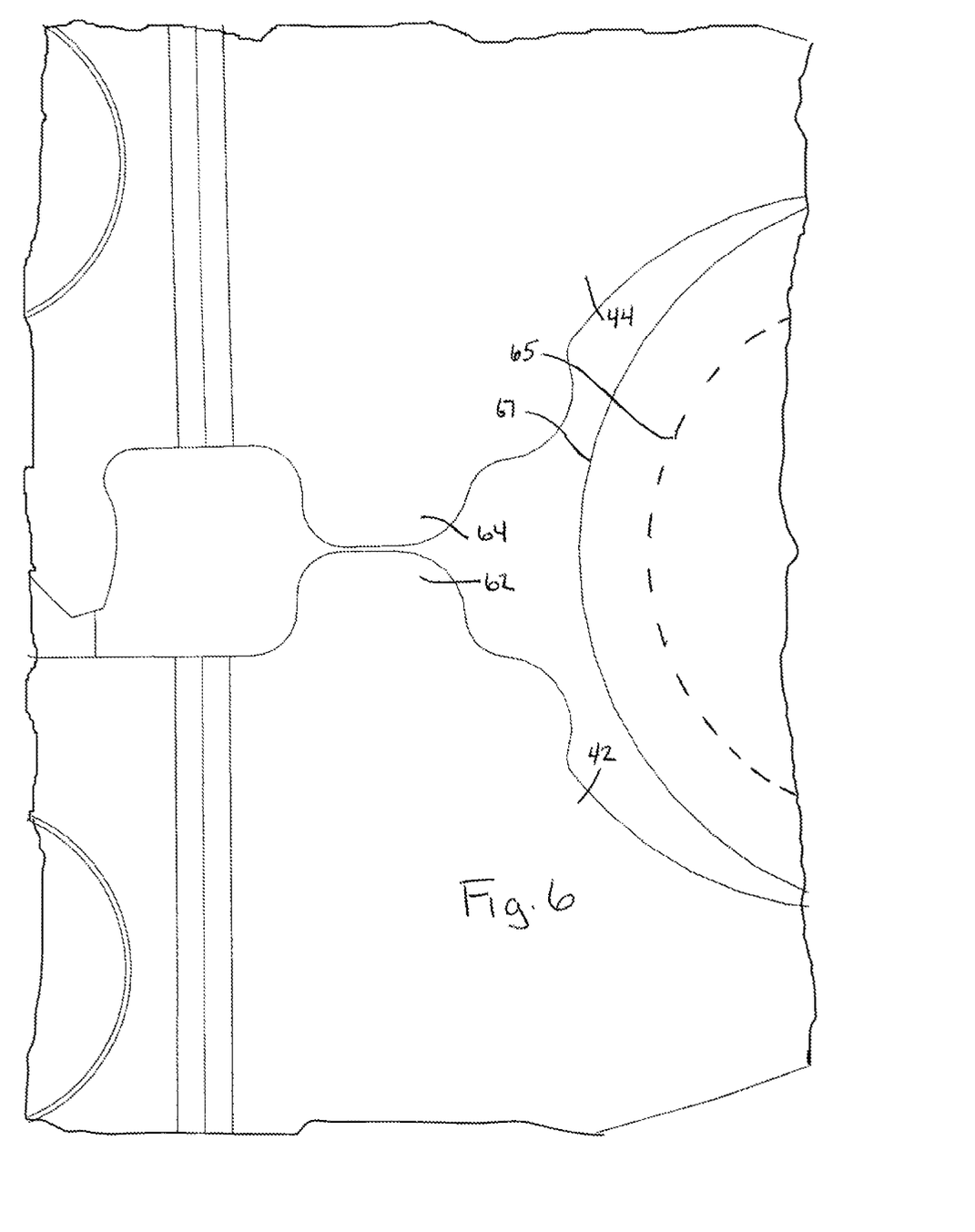
FIG. 6 is an enlarged partial view of FIG. 5.
Figure 7:
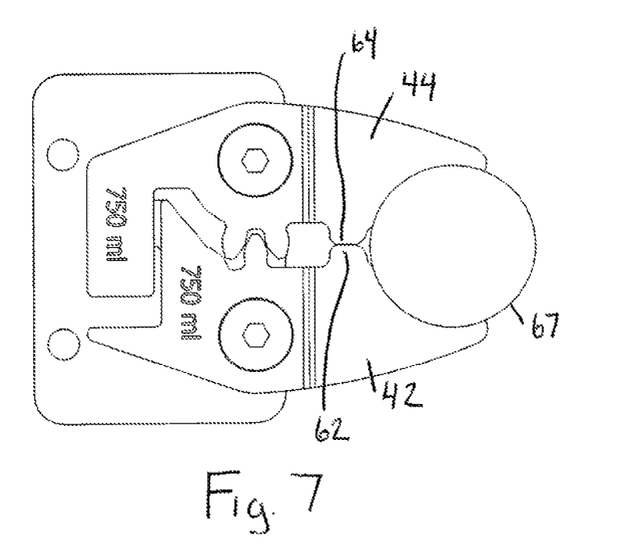
FIG. 7 is a bottom plan view of the gripper fully engaged with a bottle neck.
Figure 8:
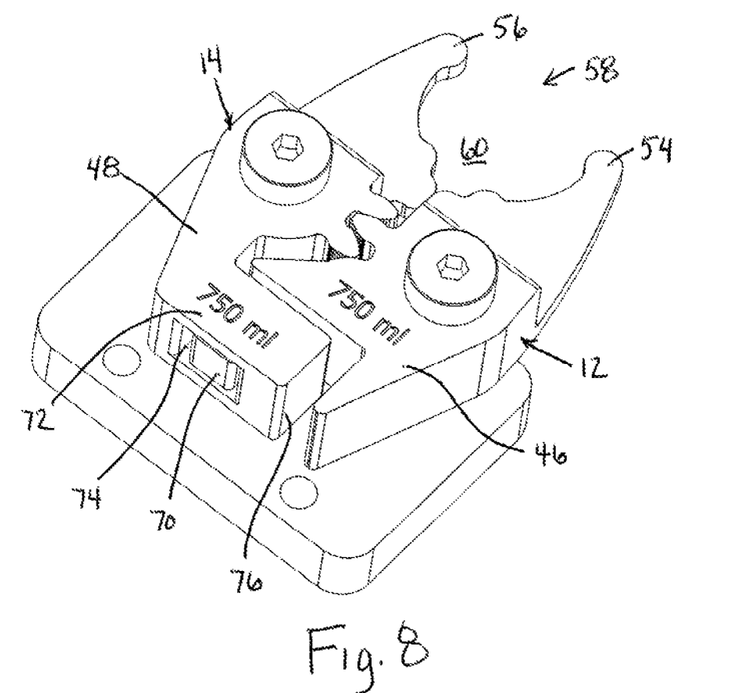
FIG. 8 is another bottom perspective view of the gripper.
Figure 9:
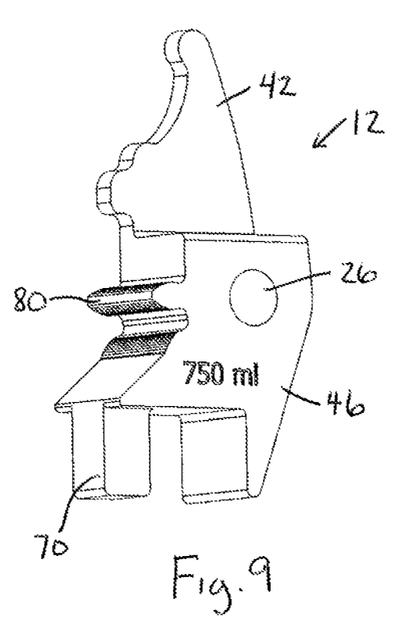
FIG. 9 is a perspective view of one jaw component.
Figure 10:
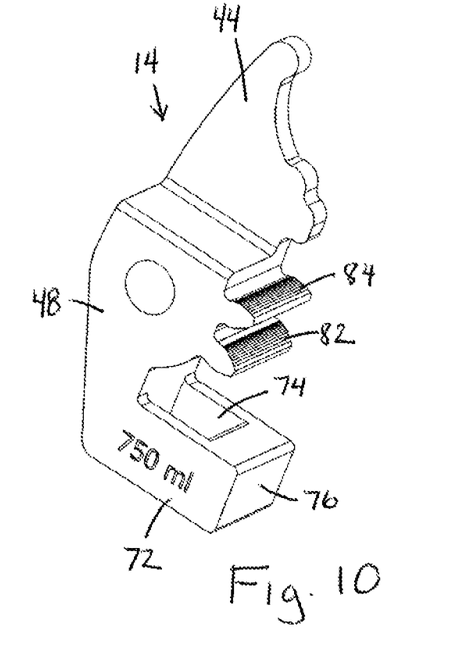
FIG. 10 is a perspective view of the other jaw component.
Figure 11:
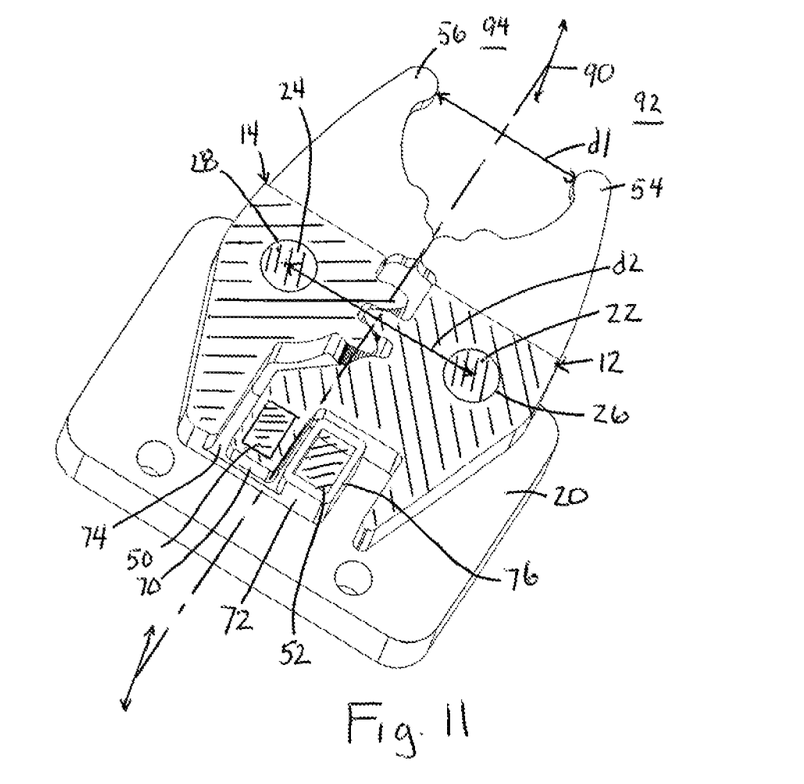
FIG. 11 is a cross-section of the gripper taken in a plane running perpendicular to the pivot axes of the jaw components.
Figure 12:
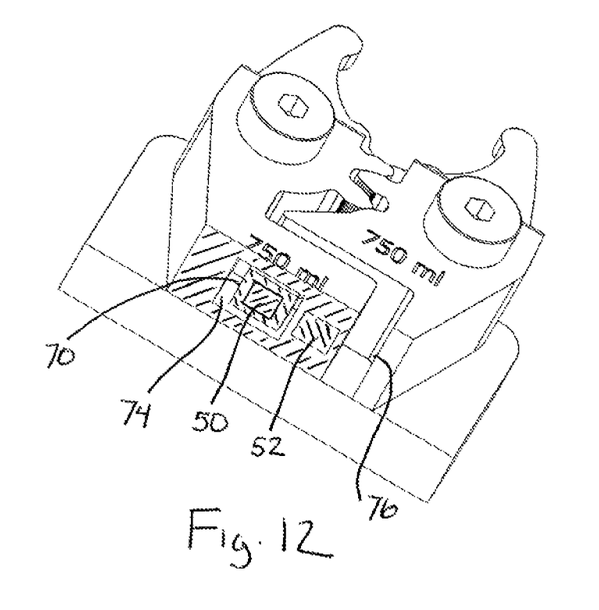
FIG. 12 is a cross-section of the gripper taken in a plane running parallel to the pivot axes of the jaw components.

The grip parts 42, 44 include respective distal/free ends 54, 56, and the bottle neck gripper includes a resting state (e.g., per FIG. 3) in which the distal ends are spaced from each other by a resting linear distance d1 to define a passage 58 for entry of a bottle neck. The grip parts 42, 44 are shaped to define a neck grip and retaining mouth 60 inward of the passage. The grip parts also include opposed stabilizing projections 62, 64 that engage with each other to define the resting state (e.g., to set the distance d1). The distance d1 can be matched to a specific bottle neck size, or range of sizes, to be handled. In this regard, as best seen in FIGS. 5 and 6, the distance d1 is set such that, during insertion of a bottle neck 65 of a bottle 67 into the passage 58, the periphery of the bottle neck engages with and moves the distal ends 54, 56 away from each other (e.g., opposite the directions D1 and D2 of FIG. 3) against the attractive force between the permanent magnets, causing the stabilizing projections 62, 64 separate from each other during bottle entry (per FIG. 6). Entry of the bottle neck 65 into the neck retaining mouth 60 allows the distal ends to move back toward each other as a result of the attractive force between the permanent magnets 50, 52, per the bottle neck position of FIG. 7. The bottle neck 65 typically includes an enlarged portion (e.g., rim or flange) above the portion of the bottle neck that engages with and moves the distal ends, such that the bottle will be vertically supported by the grip parts 42, 44, and the distal ends 54, 56 partially surround the bottle neck to provide a degree of lateral retention of the bottle neck in the mouth 60. The degree of lateral retention will vary according to the strength of the magnetic attraction between the permanent magnets 50, 52. Pulling the bottle laterally away from the grip mouth 60, through the passage 58, with sufficient lateral force will cause the bottle neck to again engage with and move the distal ends 54, 56 away from each other to permit bottle removal. After removal, the grip parts 42, 44 will return to the resting state, awaiting insertion of another bottle neck.

Jaw component 12 includes a gear tooth 80 that is positioned between a pair of gear teeth 82, 84 of jaw component 14. The interaction of these gear teeth helps to assure that both jaw components pivot during movement of a bottle neck into or out of the mouth 60.

In the illustrated embodiment, jaw components 12, 14 comprise a plastic material and the permanent magnets are encased within the plastic material of the jaw components (e.g., by an over-mold process). This arrangement helps to assure that the magnets do not become separated and lost from the gripper assembly.

As best seen in FIGS. 8-12, the biasing part 46 of jaw component 12 includes a projecting finger 70 on which the permanent magnet 50 is carried (e.g., encased as described above), and the biasing part 48 of jaw component 14 includes a leg 72 on which the permanent magnet 52 is carried (e.g., encased as described above). The leg 72 includes an opening 74 and the permanent magnet 52 is located between a distal end 76 of the leg and the opening 74. The finger 70, and thus the permanent magnet 50 as well, is positioned in the opening 74 to position the permanent magnet 50 in magnetic proximity to the permanent magnet 52 to provide the desired attractive force between the two magnets for biasing the jaws to closed or resting state. The opening 74 is sized larger than the finger 70 to allow movement of the finger 70 within the opening 74 as the jaw components 12, 14 pivot during engagement with a bottle neck.

Notably, the configuration of the biasing parts 44, 48 and positioning of the permanent magnets 50, 52 on such parts results in a unique gripper orientation. In particular, the pivot axes 16, 18 run substantially parallel to each other and pivot axes are separated from each other by a linear distance d2 (see FIG. 11) that runs perpendicular to the axes. An imaginary, bisecting plane 90 bisects both the linear distance d1 and the linear distance d2, and the plane runs substantially parallel to the pivot axes. The distal end 54 of the jaw component 12 is positioned on one side 92 of the bisecting plane 90, while the permanent magnet 50 of the jaw component 12 is positioned on the other, opposite side 94 of the bisecting plane 90. Likewise, the distal end 56 of jaw component 14 is positioned on 94 side of the bisecting plane 90, while the permanent magnet 52 of the jaw component 14 is positioned on the other side 92 of the bisecting plane 90.

Moreover, per FIG. 5, a distance d3 between the permanent magnet 50 and the pivot axis 18 is smaller than a distance d4 between the permanent magnet 52 and the pivot axis 18, and a distance d5 between the permanent magnet 52 and the pivot axis 16 is smaller than a distance d6 between the permanent magnet 50 and the first pivot axis 16.

It is to be clearly understood that the above description is intended by way of illustration and example only, is not intended to be taken by way of limitation, and that other changes and modifications are possible.

What is claimed is:

1. A bottle neck gripper, comprising:
a first jaw component mounted for pivot about a first pivot axis, the first jaw component including a first grip part and a first biasing part, wherein the first pivot axis intersects the first jaw component at a first location between the first grip part and the first biasing part, wherein the first jaw component includes a first permanent magnet carried on the first biasing part;
a second jaw component mounted for pivot about a second pivot axis, the second jaw component including a second grip part and a second biasing part, wherein the second pivot axis intersects the second jaw component at a second location between the second grip part and the second biasing part, wherein the second jaw component includes a second permanent magnet carried on the second biasing part;
wherein the first permanent magnet and the second permanent magnet are positioned to be attracted to each other and an attractive force between the first permanent magnet and the second permanent magnet urges the first grip part and the second grip part together;

wherein the first pivot axis is substantially parallel to the second pivot axis, wherein the first pivot axis is spaced apart from the second pivot axis, wherein a distance between the first permanent magnet and the second pivot axis is smaller than a distance between the second permanent magnet and the second pivot axis, wherein a distance between the second permanent magnet and the first pivot axis is smaller than a distance between the first permanent magnet and the first pivot axis.

2. The bottle neck gripper of claim 1, wherein the first grip part includes a first distal end and the second grip part includes a second distal end, wherein the bottle neck gripper includes a resting state in which the first distal end and the second distal end are spaced from each other by a first linear distance to define a passage for entry of a bottle neck.

3. The bottle neck gripper of claim 2, wherein insertion of the bottle neck into the passage moves the first distal end and the second distal end away from each other against the attractive force between the first permanent magnet and the second permanent magnet, wherein the first grip part and the second grip part are shaped to define a neck retaining mouth inward of the passage, wherein entry of the bottle neck into the neck retaining mouth allows the first distal end and the second distal end to move back toward each other as a result of the attractive force between the first permanent magnet and the second permanent magnet.

4. The bottle neck gripper of claim 1, wherein the first jaw component comprises a plastic material and the first permanent magnet is encased within the plastic material of the first jaw component, and the second jaw component comprises a plastic material and the second permanent magnet is encased within the plastic material of the second jaw component.

5. The bottle neck gripper of claim 2, wherein the first pivot axis is separated from the second pivot axis by a second linear distance, wherein a bisecting plane bisects the first linear distance and the second linear distance and runs substantially parallel to the first pivot axis and the second pivot axis, wherein the first distal end is positioned on a first side of the bisecting plane and the first permanent magnet is positioned on a second side of the bisecting plane, wherein the second distal end is positioned on the second side of the bisecting plane and the second permanent magnet is positioned on the first side of the bisecting plane.

6. The bottle neck gripper of claim 1, wherein the first biasing part includes a projecting finger on which the first permanent magnet is carried, the second biasing part includes a leg on which the second permanent magnet is carried, the leg including an opening, the second permanent magnet located between a distal end of the leg and the opening, wherein the finger is positioned in the opening to position the first permanent magnet in proximity to the second permanent magnet.

7. The bottle neck gripper of claim 6, wherein the opening is sized larger than the finger to allow movement of the finger within the opening as the first jaw component and the second jaw component pivot during engagement with a bottle neck.

8. A bottle neck gripper, comprising:

a first jaw component mounted for pivot about a first pivot axis, the first jaw component including a first grip part and a first biasing part, the first biasing part carrying a first permanent magnet;

a second jaw component mounted for pivot about a second pivot axis, the second jaw component including a second grip part and a second biasing part, the second biasing part carrying a second permanent magnet;

wherein the first grip part includes a first distal end and the second grip part includes a second distal end, wherein the bottle neck gripper includes a resting state in which the first distal end and the second distal end are spaced from each other by a first linear distance to define a passage for entry of a bottle neck;

wherein the first pivot axis is substantially parallel to the second pivot axis, wherein the first pivot axis is separated from the second pivot axis by a second linear distance, wherein a bisecting plane bisects the first linear distance and the second distance and runs substantially parallel to the first pivot axis and the second pivot axis, wherein the first distal end is positioned on a first side of the bisecting plane and the first permanent magnet is positioned on a second side of the bisecting plane, wherein the second distal end is positioned on the second side of the bisecting plane and the second permanent magnet is positioned on the first side of the bisecting plane;

wherein the second permanent magnet of the second biasing part is located toward a distal end of the second biasing part;

wherein the first permanent magnet of the first biasing part overlies a portion of the second biasing part that is spaced from both the distal end of the second biasing part and the second permanent magnet.

9. The bottle neck gripper of claim 8, wherein the first permanent magnet and the second permanent magnet are positioned to be attracted to each other and an attractive force between the first permanent magnet and the second permanent magnet urges the first grip part and the second grip part together.

10. A bottle neck gripper, comprising:

a first jaw component mounted for pivot about a first pivot axis, the first jaw component including a first grip part, the first jaw component carrying a first permanent magnet;

a second jaw component mounted for pivot about a second pivot axis, the second jaw component including a second grip part, the second jaw component carrying a second permanent magnet;

wherein the first jaw component includes a projecting finger on which the first permanent magnet is carried, the second jaw component includes a leg on which the second permanent magnet is carried, the leg including an opening, wherein the finger is positioned in the opening to position the first permanent magnet in proximity to the second permanent magnet.

11. The bottle neck gripper of claim 10, wherein the second permanent magnet is located between a distal end of the leg and the opening.

12. The bottle neck gripper of claim 10, wherein the first permanent magnet and the second permanent magnet are positioned to be attracted to each other and an attractive force between the first permanent magnet and the second permanent magnet urges the first grip part and the second grip part together.

\* \* \* \* \*